US010537856B2

(12) United States Patent
Shibata et al.

(10) Patent No.: US 10,537,856 B2
(45) Date of Patent: Jan. 21, 2020

(54) HOLLOW FIBER MEMBRANE AND HOLLOW FIBER MEMBRANE MODULE (71) Applicant: Mitsubishi Chemical Corporation, Tokyo (JP)

(72) Inventors: Noritaka Shibata, Toyohashi (JP); Kenjiro Takayanagi, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/505,752

(22) PCT Filed: Aug. 21, 2015

(86) PCT No.: PCT/JP2015/073531
§ 371 (c)(1),
(2) Date: Feb. 22, 2017

(87) PCT Pub. No.: WO2016/031713
PCT Pub. Date: Mar. 3, 2016

(65) Prior Publication Data
US 2017/0266624 A1    Sep. 21, 2017

(30) Foreign Application Priority Data

Aug. 26, 2014 (JP) ................................. 2014-171904

(51) Int. Cl.
*B01D 69/02* (2006.01)
*B01D 69/04* (2006.01)
(Continued)

(52) U.S. Cl.
CPC ........... *B01D 69/02* (2013.01); *B01D 69/043* (2013.01); *C08L 23/12* (2013.01); *C08L 25/06* (2013.01);
(Continued)

(58) Field of Classification Search
None
See application file for complete search history.

(56) References Cited

U.S. PATENT DOCUMENTS 5,264,488 A    11/1993   Takeuchi et al.
5,616,420 A     4/1997   Yamaoka et al.
(Continued)

FOREIGN PATENT DOCUMENTS

EP    1316356 A2    6/2003
EP    1421988 A1    5/2004
(Continued)

OTHER PUBLICATIONS

International Search Report for corresponding International Patent Application No. PCT/JP2015/073531, dated Oct. 27, 2015.
(Continued)

*Primary Examiner* — Krishnan S Menon
(74) *Attorney, Agent, or Firm* — Morgan, Lewis & Bockius LLP (57) ABSTRACT The invention provides a hollow fiber membrane exhibiting a favorable gas permeation performance and an excellent heat resistance in which the generation of pinholes are suppressed, and a hollow fiber membrane module using the same. The hollow fiber membrane comprising a gas permeable nonporous layer; and a porous supporting layer to support the nonporous layer formed of a thermoplastic elastomer having a DSC melting peak temperature of 130° C. or higher and a rupture elongation prescribed in ISO 37 (2010) of 300% or more.

12 Claims, 2 Drawing Sheets (51) Int. Cl.
  *C08L 23/12* (2006.01)
  *C08L 25/06* (2006.01)
  *C08L 67/02* (2006.01)
(52) U.S. Cl.
  CPC .......... *C08L 67/02* (2013.01); *C08L 2207/04* (2013.01); *C08L 2207/062* (2013.01)

(56) References Cited

U.S. PATENT DOCUMENTS

| | | | |
|---|---|---|---|
| 6,379,796 B1 * | 4/2002 | Uenishi | B01D 19/0031 428/375 |
| 2013/0255498 A1 | 10/2013 | Shibata | |

FOREIGN PATENT DOCUMENTS

| | | |
|---|---|---|
| JP | 04-314452 A | 11/1992 |
| JP | 07-068722 A | 3/1995 |
| JP | 07-155568 A | 6/1995 |
| JP | 08-275985 A | 10/1996 |
| JP | 11-047565 A | 2/1999 |
| JP | 11-104473 A | 4/1999 |
| JP | 2000-288369 A | 10/2000 |
| JP | 2008-272696 A | 11/2008 |
| WO | 99/17866 A1 | 4/1999 |
| WO | 2012/043613 A1 | 4/2012 |

OTHER PUBLICATIONS

Song et al., "Changes in Gas-Transport Properties with the Phase Structure of Blends Containing Styrene-Butadiene-Styrene Triblock Copolymer and Poly(2,6-dimethyl-1,4-phenylene oxide)", Industrial & Engineering Chemistry Research, 49:6587-6592 (2010).
Park et al., "Morphological effect of dispersed phase on gas permeation properties through heterophase polymer membrane: theoretical and experimental approaches", Polymer, 41:1765-1771 (2000).
Extended European Search Report issued in corresponding European Patent Application No. 15836260.8 dated Jul. 19, 2017.
Communication pursuant to Article 94(3) EPC issued in corresponding European Patent Application No. 15836260.8, dated Sep. 14, 2018.
Bhadha, "How Weld Hose Materials Affect Shielding Gas Quality", Welding Journal, Jul. 1999, pp. 35-40.

* cited by examiner

HOLLOW FIBER MEMBRANE AND HOLLOW FIBER MEMBRANE MODULE

TECHNICAL FIELD

The present invention relates to a hollow fiber membrane to be used when removing dissolved gas from a liquid, and the like, and a hollow fiber membrane module including the same.

This application is based upon and claims the benefit of priority of the prior Japanese Patent Application No. 2014-171904 filed in Japan on Aug. 26, 2014, the entire contents of which are incorporated herein by reference.

BACKGROUND ART

As a deaeration method of removing dissolved gas from a liquid, there is a method using a hollow fiber membrane. Hollow fiber membranes to be used in deaeration applications are required to exhibit solvent resistance and low dissolution properties to liquids to be treated, and polyolefins exhibiting these excellent properties are thus used as a membrane material in some cases.

For example, a composite membrane in which a homogeneous thin membrane formed by using an ethylene-higher olefin copolymer or a propylene-higher olefin copolymer, which is a low-density polyolefin, is laminated on a porous substrate is known (for example, see Patent Literatures 1 and 2). Patent Literature 3 discloses a hollow fiber membrane formed of poly(4-methylpentene-1).

CITATION LIST

Patent Literature

Patent Literature 1: JP 11-47565 A
Patent Literature 2: JP 2008-272696 A
Patent Literature 3: JP 7-155568 A

SUMMARY OF THE INVENTION

Problem to be Solved by the Invention

However, a thin membrane formed of an ethylene-higher olefin copolymer or a propylene-higher olefin copolymer, which is a low-density polyolefin, has a low oxygen permeability coefficient. Hence, it is desirable to form a thin membrane of being 0.3 or less in order to obtain a practically effective permeation flow rate of the dissolved gas in the case of using these. Such a thin membrane has a low mechanical strength and pinholes are likely to be generated on the thin membrane.

In addition, poly(4-methylpentene-1) is likely to be oxidized although it has an excellent oxygen permeability coefficient to be 150% of low-density polyethylene as a substance. Hence, it is required to add a large amount of an antioxidant in the case of using poly(4-methylpentene-1) as a membrane material, and there is thus a problem such as dissolution of the antioxidant. In addition, poly(4-methylpentene-1) is likely to be brittle at a low temperature of 25° C. or lower since the glass transition point thereof is higher than 25° C. and 30° C. or lower. Hence, a membrane formed of poly(4-methylpentene-1) is likely to rupture when a solution is supplied at a low temperature, a shocking external pressure is applied, or the like.

Examples of another polyolefin may include polypropylene. Polypropylene exhibits excellent heat resistance, rigidity, and the like, and it is thus suitable as a membrane material, for example, in a case in which the liquid to be treated is a high-temperature liquid such as hot water particularly from the viewpoint of exhibiting heat resistance. However, polypropylene has a low oxygen permeability coefficient to be 60% or less of low-density polyethylene as a substance. Hence, it is required to form an extremely thin membrane of being 0.1 μm or less in order to obtain a practically effective permeation flow rate of the dissolved gas in the case of using polypropylene. The thin membrane has a low mechanical strength and pinholes are likely to be generated on the thin membrane as well as it is difficult to process such an extremely thin membrane.

The invention has been made in view of the above circumstances, and an object thereof is to provide a hollow fiber membrane which exhibits favorable gas permeation performance and excellent heat resistance and in which the generation of pinholes are suppressed, and a hollow fiber membrane module using the same.

Means for Solving Problem

As a result of intensive investigations, the present inventors have found out that a nonporous layer formed by using a composition containing a polyolefin and a specific styrene-based thermoplastic elastomer has sufficient gas permeation performance without having an excessively thinned thickness, the generation of pinholes are also suppressed in the nonporous layer since the thickness thereof is not required to be excessively thinned, and the nonporous layer also exhibits excellent heat resistance, thereby completing the invention.

The invention has the following configurations.

[1] A hollow fiber membrane having:
a gas permeable nonporous layer; and
a porous supporting layer to support the nonporous layer, in which
the nonporous layer is formed of a thermoplastic elastomer, in which
the thermoplastic elastomer has a DSC melting peak temperature of 130° C. or higher and a rupture elongation prescribed in ISO 37 (2010) of 300% or more.

[2] The hollow fiber membrane according to [1], in which the nonporous layer is formed of a composition containing a styrene-based thermoplastic elastomer (I) containing at least either of an ABA type styrene-based thermoplastic elastomer (α) having a polystyrene portion (A) and a poly-conjugated diene portion (B) or a hydrogenated product (αh) of the ABA type styrene-based thermoplastic elastomer (α) and a polyolefin (II), in which
the poly-conjugated diene portion (B) contains at least either of a 1,2-bonding unit or a 3,4-bonding unit, in which
a total amount of the 1,2-bonding unit and the 3,4-bonding unit is 50% by mole or more with respect to a total amount of the entire units constituting the poly-conjugated diene portion (B).

[3] The hollow fiber membrane according to [2], in which the composition contains the styrene-based thermoplastic elastomer (I) at 60% by mass or more and 90% by mass or less with respect to a total amount of the styrene-based thermoplastic elastomer (I) and the polyolefin (II).

[4] The hollow fiber membrane according to [2] or [3], in which the poly-conjugated diene portion (B) contains at least either of butadiene or isoprene as a component.

[5] The hollow fiber membrane according to any one of [2] to [4], in which a total content of the ABA type styrene-based thermoplastic elastomer (α) and the hydrogenated product (αh) is 50% by mass or more with respect to 100% by mass of the styrene-based thermoplastic elastomer (I).

[6] The hollow fiber membrane according to any one of [2] to [5], in which the polyolefin (II) is at least either of polypropylene or unsaturated carboxylic acid-modified polypropylene.

[7] The hollow fiber membrane according to any one of [1] to [6], in which a thickness of the nonporous layer is 0.5 μm or more and 10 μm or less.

[8] The hollow fiber membrane according to any one of [1] to [7], in which the porous supporting layer is formed of polyethylene.

[9] The hollow fiber membrane according to [8], in which polyethylene is high-density polyethylene.

[10] A hollow fiber membrane module including the hollow fiber membrane according to any one of [1] to [9].

The invention has the following configurations.

(1) A hollow fiber membrane having:
a gas permeable homogeneous layer; and
a porous supporting layer to support the homogeneous layer, in which
the homogeneous layer is formed of a composition containing a styrene-based thermoplastic elastomer (I) containing at least either of an ABA type styrene-based thermoplastic elastomer (α) having a polystyrene portion (A) and a poly-conjugated diene portion (B) or a hydrogenated product (αh) of the ABA type styrene-based thermoplastic elastomer (α) and a polyolefin (II), in which
the poly-conjugated diene portion (B) contains at least either of a 1,2-bonding unit or a 3,4-bonding unit, in which
a total amount of the 1,2-bonding unit and the 3,4-bonding unit is 50% by mole or more with respect to a total amount of the entire units constituting the poly-conjugated diene portion (B).

(2) The hollow fiber membrane according to (1), in which the composition contains the styrene-based thermoplastic elastomer (I) at 60% by mass or more and 90% by mass or less with respect to a total amount of the styrene-based thermoplastic elastomer (I) and the polyolefin (II).

(3) The hollow fiber membrane according to (1) or (2), in which the poly-conjugated diene portion (B) contains one or more kinds between butadiene and isoprene as a component.

(4) The hollow fiber membrane according to any one of (1) to (3), in which a total content of the ABA type styrene-based thermoplastic elastomer (α) and the hydrogenated product (αh) in the styrene-based thermoplastic elastomer (I) is 50% by mass or more.

(5) The hollow fiber membrane according to any one of (1) to (4), in which the polyolefin (II) is one or more kinds between polypropylene and unsaturated carboxylic acid-modified polypropylene.

(6) The hollow fiber membrane according to any one of (1) to (5), in which a thickness of the homogeneous layer is from 0.5 μm to 10 μm.

(7) The hollow fiber membrane according to any one of (1) to (6), in which the porous supporting layer is formed of polyethylene.

(8) The hollow fiber membrane according to (7), in which polyethylene is high-density polyethylene.

(9) A hollow fiber membrane module including the hollow fiber membrane according to any one of (1) to (8).

Effect of the Invention

According to the invention, it is possible to provide a hollow fiber membrane which exhibits favorable gas permeation performance and excellent heat resistance and in which the generation of pinholes are suppressed and a hollow fiber membrane module using the same.

MODE(S) FOR CARRYING OUT THE INVENTION

Hereinafter, the invention will be described in detail.

<Hollow Fiber Membrane>

The hollow fiber membrane of the invention is a composite hollow fiber membrane consisting of two or more layers including a gas permeable nonporous layer and a porous supporting layer to support the nonporous layer. Examples of the specific layer constitution of the hollow fiber membrane may include a two-layer structure of a nonporous layer and a porous supporting layer and a three-layer structure in which one nonporous layer is sandwiched between two porous supporting layers, and a three-layer structure in which one nonporous layer is sandwiched between two porous supporting layers is preferable from the viewpoint of strength and the like.

[Nonporous Layer]

The nonporous layer is formed of a thermoplastic elastomer having a DSC melting peak temperature of 130° C. or higher and a rupture elongation prescribed in ISO 37 (2010) of 300% or more. This thermoplastic elastomer is preferably composed of a composition containing a specific styrene-based thermoplastic elastomer (I) and a polyolefin (II) which are described later. The composition has sufficient gas permeation performance without excessively thinning the thickness of the nonporous layer. In addition, the generation of pinholes is suppressed in the nonporous layer formed of the composition since the thickness thereof is not required to be excessively thinned.

The thickness of the nonporous layer is preferably 0.5 μm or more and 10 μm or less and more preferably 0.75 μm or more and 5 μm or less. The pressure resistance at the time of use is preferable when the thickness of the nonporous layer is 0.5 μm or more, and the gas permeation performance is preferable when the thickness is 10 μm or less.

The density of the nonporous layer is preferably 0.88 g/cm$^3$ or more and 0.91 g/cm$^3$ or less from the viewpoint of being a resin containing the polyolefin (II).

The film thickness of the nonporous layer is measured by observing the vertical section to the longitudinal direction of the hollow fiber membrane through a microscope such as a scanning electron microscope, a transmission electron microscope, or an atomic microscope. In the present specification, the film thickness is determined by a method in which the hollow fiber membrane is cut by a freeze-fracturing method using liquid nitrogen or the like, the vertical section thus obtained is observed, and the film thickness of the nonporous layer is measured. The number of samples for measurement is set to 6, and the average value thereof is adopted.

The thermoplastic elastomer forming the nonporous layer has a DSC melting peak temperature of 130° C. or higher and a rupture elongation prescribed in ISO 37 of 300% or more.

The DSC melting peak temperature of the thermoplastic elastomer forming the nonporous layer is a value measured by using a differential scanning calorimeter (DSC), and it is preferably 130° C. or higher and 165° C. or lower and more preferably 150° C. or higher and 160° C. or lower from the viewpoints of heat resistance, moldability, and the like.

In addition, the rupture elongation of the thermoplastic elastomer forming the nonporous layer was measured by using a dumbbell for tensile test fabricated by forming the polymer used in the nonporous layer into a sheet and a tensile tester (Tensilon 200 manufactured by TOYO SEIKI SEISAKU-SHO, LTD.). The shape of the dumbbell for tensile test is based on the shape No. 3 in ISO 37 (JIS K 6251) of the international standard. Specifically, the rupture elongation is the elongation (unit %) at the time of rupture measured under a condition having a tensile rate of 5 cm/min in an environment having a temperature of 23° C. and a humidity of 50%, it is a value determined based on the prescription of ISO 37 (2010), and (it is preferably 300% or more and more preferably 500% or more from the viewpoint of sufficiently securing the elongation so as to avoid brittleness at a low temperature and not to be cracked. In addition, it is preferably 1500% or less, more preferably 1250% or less, and still more preferably 1000% or less from the viewpoint of flexibility, durability, and the like of the hollow fiber membrane.

(Styrene-Based Thermoplastic Elastomer (I))

The styrene-based thermoplastic elastomer (I) in the invention contains at least either of a block copolymer having a polystyrene portion (A) composed of a unit derived from a vinyl aromatic hydrocarbon and a poly-conjugated diene portion (B) composed of a unit derived from a conjugated diene or a hydrogenated product of the block copolymer.

Examples of this block copolymer may include an $(A-B)_{n1}$ type block copolymer, an $A-(B-A)_{n2}$ type block copolymer, and $B-(A-B)_{n3}$ type block copolymer (provided that n1, n2, and n3 are each an integer 1 or more) from the viewpoint of bonding form between the polystyrene portion (A) and the poly-conjugated diene portion (B).

In the invention, the styrene-based thermoplastic elastomer (I) may be a mixture of these block copolymers with any hydrogenated product thereof, but it contains at least either of an ABA type styrene-based thermoplastic elastomer (α) to be described in detail later or a hydrogenated product (αh) of the ABA type styrene-based thermoplastic elastomer (α) from the viewpoint of obtaining a hollow fiber membrane which exhibits excellent gas permeation performance.

The styrene-based thermoplastic elastomer (I) contains the ABA type styrene-based thermoplastic elastomer (α) and a hydrogenated product (αh) thereof at preferably 50% by mass or more, more preferably 60% by mass or more, and particularly preferably 70% by mass or more in total in 100% by mass of the styrene-based thermoplastic elastomer (I) from the viewpoint of more easily obtaining a hollow fiber membrane which exhibits excellent gas permeation performance. The upper limit value of the total content of the ABA type styrene-based thermoplastic elastomer (α) and a hydrogenated product (αh) thereof in the styrene-based thermoplastic elastomer (I) is not particularly limited, and it is 100% by mass.

Examples of the constituent unit which is derived from a vinyl aromatic hydrocarbon and constitutes the polystyrene portion (A) of the block copolymer may include a constituent unit derived from styrene, α-methylstyrene, (o-, m-, p-) methylstyrene, 1,3-dimethylstyrene, vinylnaphthalene, or vinylanthracene. Among these, a constituent unit derived from styrene or α-methylstyrene is preferable and a constituent unit derived from styrene is more preferable from the viewpoint of moldability and cost.

The constituent unit derived from a vinyl aromatic hydrocarbon may be one kind or two or more kinds.

Examples of the constituent unit which is derived from a conjugated diene and constitutes the poly-conjugated diene portion (B) of the block copolymer may include a constituent unit derived from butadiene or isoprene. The constituent unit derived from a conjugated diene may be one kind or two or more kinds, and it is preferable to select one or more kinds from constituent units derived from butadiene or isoprene.

In a case in which the poly-conjugated diene portion (B) is composed of a constituent unit derived from butadiene, it is possible that there are a 1,4-bonding unit and a 1,2-bonding unit as a unit constituting the poly-conjugated diene portion (B). The 1,4-bonding unit derived from butadiene is [—$CH_2$—CH═CH—$CH_2$—], and the 1,2-bonding unit derived from butadiene is [—$CH_2$—CH(CH═$CH_2$)—].

In a case in which the poly-conjugated diene portion (B) is composed of a constituent unit derived from isoprene, it is possible that there are a 1,4-bonding unit, a 3,4-bonding unit, and a 1,2-bonding unit as a unit constituting the poly-conjugated diene portion (B). The 1,4-bonding unit derived from isoprene is [—$CH_2$—C($CH_3$)═CH—$CH_2$—], the 3,4-bonding unit derived from isoprene is [—$CH_2$—CH(C($CH_3$)═$CH_2$)—], and the 1,2-bonding unit derived from isoprene is [—$CH_2$—C($CH_3$)(CH═$CH_2$)—].

In a case in which the poly-conjugated diene portion (B) is composed of constituent units derived from butadiene and isoprene, it is possible that there are a 1,4-bonding unit and a 1,2-bonding unit which are derived from butadiene and a 1,4-bonding unit, a 3,4-bonding unit, and a 1,2-bonding unit which are derived from isoprene as a unit constituting the poly-conjugated diene portion (B).

As described above, in a case in which the poly-conjugated diene portion (B) is composed of at least either of a constituent unit derived from butadiene or a constituent unit derived from isoprene, it is possible that there are a 1,2-bonding unit, a 1,4-bonding unit, and a 3,4-bonding unit, as a unit constituting the poly-conjugated diene portion (B).

In the invention, as the ABA type styrene-based thermoplastic elastomer (α), one in which the poly-conjugated diene portion (B) has the following constitution is used from the viewpoint of obtaining a hollow fiber membrane which exhibits excellent gas permeation performance.

Incidentally, the ABA type styrene-based thermoplastic elastomer (α) is a triblock copolymer having a long and continuous bonding form in which the poly-conjugated diene portion (B) composed of a unit derived from a conjugated diene is disposed between the polystyrene portions (A) composed of a unit derived from a vinyl aromatic hydrocarbon.

Poly-Conjugated Diene Portion (B):

The poly-conjugated diene portion (B) in the ABA type styrene-based thermoplastic elastomer (α) contains at least either of the 1,2-bonding unit or the 3,4-bonding unit among the 1,2-bonding unit, the 1,4-bonding unit, and the 3,4-bonding unit, and the total amount of the 1,2-bonding unit and the 3,4-bonding unit is 50% by mole or more with respect to the total amount of the entire units (namely, the 1,2-bonding unit, the 1,4-bonding unit, and the 3,4-bonding unit) constituting the poly-conjugated diene portion (B).

Examples of monomers constituting the 1,2-bonding unit, the 1,4-bonding unit, and the 3,4-bonding unit may include butadiene and isoprene.

The total amount of the 1,2-bonding unit and the 3,4-bonding unit in the poly-conjugated diene portion (B) of the ABA type styrene-based thermoplastic elastomer (cc) is 60% by mole or more and 100% or less by mole, preferably 60% by mole or more and 80% by mole or less, and more preferably 60% by mole or more and 70% by mole or less with respect to the total amount of the entire units. It is preferably 80% by mole or less and more preferably 70% by mole or less from the viewpoint of ease of production of the ABA type styrene-based thermoplastic elastomer (cc).

It is considered that a hollow fiber membrane which exhibits excellent gas permeation performance is obtained when an ABA type styrene-based thermoplastic elastomer having a total amount of the 1,2-bonding unit and 3,4-bonding unit in the poly-conjugated diene portion (B) in the above range is used since the compatibility with the polyolefin (II) to be described later is improved although the free volume of the poly-conjugated diene portion (B) increases and the free volume of the amorphous portion of the polyolefin (II) is also increased.

The amount of each unit in the poly-conjugated diene portion (B) is determined by nuclear magnetic resonance (NMR) spectrum analysis as to be described in Examples later.

The ABA type styrene-based thermoplastic elastomer (cc) may be used singly or two or more kinds thereof may be used concurrently.

From the viewpoint of moldability and gas permeability, in the ABA type styrene-based thermoplastic elastomer (cc), it is preferable that the content of the polystyrene portion (A) is 5% by mass or more and 45% by mass or less with respect to 100% by mass of the total of the polystyrene portion (A) and the poly-conjugated diene portion (B) and the content of the poly-conjugated diene portion (B) is 55% by mass or more and 95% by mass or less with respect to 100% by mass of the total of the polystyrene portion (A) and the poly-conjugated diene portion (B), it is more preferable that the content of the polystyrene portion (A) is 10% by mass or more and 35% by mass or less and the content of the poly-conjugated diene portion (B) is 65% by mass or more and 90% by mass or less. It is still more preferable that the content of the polystyrene portion (A) is 10% by mass or more and 20% by mass or less and the content of the poly-conjugated diene portion (B) is 80% by mass or more and 90% by mass or less.

The content of each portion in the ABA type styrene-based thermoplastic elastomer (cc) is determined by nuclear magnetic resonance (NMR) spectrum analysis.

As described above, the styrene-based thermoplastic elastomer (I) contains at least either of the ABA type styrene-based thermoplastic elastomer ($\alpha$) (block copolymer) having the polystyrene portion (A) and the poly-conjugated diene portion (B) or a hydrogenated product ($\alpha$h) of the block copolymer. The hydrogenated product is one in which some or all of the carbon-carbon double bonds in the block copolymer are hydrogenated (hydrogenated). In a case in which the styrene-based thermoplastic elastomer (I) contains a hydrogenated product, the hydrogenation rate thereof (the proportion of hydrogenated bonds among the carbon-carbon double bonds contained in the styrene-based thermoplastic elastomer (I)) is preferably 75% by mole or more, more preferably 85% by mole or more, and still more preferably 95% by mole or more from the viewpoint of obtaining a nonporous layer which exhibits excellent heat resistance and the like. The upper limit is not particularly limited, and it is usually 100% by mole.

The hydrogenation rate can be measured by nuclear magnetic resonance (NMR) spectral analysis.

The mass average molecular weight (Mw) of each of the ABA type styrene-based thermoplastic elastomer ($\alpha$) (block copolymer) and a hydrogenated product ($\alpha$h) of the block copolymer is preferably 50,000 or more and 150,000 or less and more preferably 70,000 or more and 130,000 or less as a value converted to polystyrene measured by gel permeation chromatography. The moldability of the nonporous layer is excellent when the mass average molecular weight is equal to or less than the upper limit of the above range, and a nonporous layer having an excellent mechanical strength can be produced when it is equal to or more than the lower limit of the above range.

Incidentally, the measurement conditions of gel permeation chromatography for determining the mass average molecular weight (Mw) are as follows.

Equipment: "GPC 150-C" manufactured by WATERS
Column: "SHODEX AD806MS" manufactured by Showadenkosya co., ltd.
Detector: Infrared spectroscopic detector (IR detector, 3.42 μm)
Solvent: o-dichlorobenzene
Temperature: 140° C.
Flow rate: 1 mL/min
Injection volume: 200 μL
Concentration: 0.1%
Calibration sample: High-density polyethylene
Calibration method: polystyrene conversion In a case in which the styrene-based thermoplastic elastomer (I) contains a hydrogenated product, the hydrogenated product can be produced by a method in which the block copolymer is produced and a hydrogenation reaction thereof is then conducted.

In the case of producing a hydrogenated product ($\alpha$h) of the ABA type styrene-based thermoplastic elastomer ($\alpha$), for example, by a known method using a solvent and an initiator, the polystyrene portion (A) is produced by polymerizing a vinyl aromatic hydrocarbon, subsequently, the poly-conjugated diene portion (B) is produced by polymerizing a conjugated diene, subsequently, the polystyrene portion (A) is produced by polymerizing a vinyl aromatic hydrocarbon. The ABA type styrene-based thermoplastic elastomer ($\alpha$) is thus obtained.

Subsequently, hydrogen is reacted with the ABA type styrene-based thermoplastic elastomer ($\alpha$) thus obtained in the presence of a hydrogenation reaction catalyst, whereby a hydrogenated product ($\alpha$h) of the ABA type styrene-based thermoplastic elastomer ($\alpha$) is obtained. The hydrogenated product ($\alpha$h) thus obtained may be used singly or two or more kinds thereof may be used concurrently.

Here, in order to set the total amount of the 1,2-bonding unit derived from butadiene, the 1,2-bonding unit derived from isoprene, and the 3,4-bonding unit derived from isoprene in the poly-conjugated diene portion (B) of the ABA type styrene-based thermoplastic elastomer ($\alpha$) to 50% by mole or more with respect to the total amount of the entire units, the poly-conjugated diene portion (B) may be produced by polymerizing a conjugated diene in the presence of a Lewis base. Specifically, as disclosed in JP 5-125108 A and JP 7-292203 A, an ether such as dimethyl ether, diethyl ether, or tetrahydrofuran, a glycol ether such as ethylene glycol dimethyl ether or diethylene glycol dimethyl ether, and an amine compound such as triethylamine, N,N,N',N'-tetramethylethylenediamine (TMEDA), or N-methylmorpholine are used as the Lewis base. Moreover, it is possible to control the total amount of the 1,2-bonding unit derived from butadiene, the 1,2-bonding unit derived from isoprene and the 3,4-bonding unit derived from isoprene by controlling the amount of the Lewis base used, the polymerization temperature, and the like.

As the ABA type styrene-based thermoplastic elastomer (α) in which the total amount of the 1,2-bonding unit derived from butadiene, the 1,2-bonding unit derived from isoprene, and the 3,4-bonding unit derived from isoprene is 50% by mole or more with respect to the total amount of the entire units and a hydrogenated product (αh) thereof, commercially available products can also be used. For example, a corresponding product can be appropriately selected and used from the "KRATON (registered trademark)" manufactured by Kraton Corporation, the "SEPTON (registered trademark)" and "HYBRAR (registered trademark)" manufactured by KURARAY CO., LTD., the "Tuftec (registered trademark)" manufactured by ASAHI KASEI CORPORATION, the "DYNARON (registered trademark)" manufactured by JSR Corporation, the "SIBSTAR (registered trademark)" (composed of styrene block and isobutylene block obtained by cationic polymerization) manufactured by Kaneka Corporation, and the like.

(Polyolefin (II))

As the polyolefin (II) to be used in the invention, it is preferable to use at least one kind of polypropylene or unsaturated carboxylic acid-modified polypropylene from the viewpoint of being able to form a nonporous layer exhibiting excellent heat resistance and of exhibiting excellent compatibility with the styrene-based thermoplastic elastomer.

The density of polypropylene is preferably 0.890 g/cm$^3$ or more and 0.900 g/cm$^3$ or less of a general range. The melt flow rate (JIS K 7210, 230° C., load: 21.18 N) of polypropylene is preferably 1.0 g/10 min or more and 5.0 g/10 min or less from the viewpoint of moldability and the like. The melting point of polypropylene is preferably 145° C. or higher and 165° C. or lower of a general range.

In the present specification, the melting point is a value measured by using a differential scanning calorimeter (DSC).

Unsaturated carboxylic acid-modified polypropylene is a grafted product obtained by graft-bonding an unsaturated carboxylic acid to polypropylene.

Examples of the unsaturated carboxylic acid may include anhydrous maleic acid, acrylic acid, methacrylic acid, maleic acid, itaconic acid, and fumaric acid, and anhydrous maleic acid is preferable from the viewpoint of adhesive property and compatibility with the material constituting the porous supporting layer such as polyethylene. The unsaturated carboxylic acid may be used singly or two or more kinds thereof may be used concurrently.

The acid modification rate of unsaturated carboxylic acid-modified polypropylene is preferably 0.02% by mass or more and 0.2% by mass or less from the viewpoint of the adhesive property and hue. The acid modification rate is the content of the unsaturated carboxylic acid contained in unsaturated carboxylic acid-modified polypropylene, and it is determined by using an infrared spectrophotometer.

The density of unsaturated carboxylic acid-modified polypropylene is preferably 0.880 g/cm$^3$ or more and 0.900 g/cm$^3$ or less from the viewpoint of the adhesive property and the gas permeability. The melt flow rate (JIS K 7210, 230° C., load: 21.18 N) of unsaturated carboxylic acid-modified polypropylene is preferably 1 g/10 min or more and 10 g/10 min or less from the viewpoint of moldability and the like. The melting point of unsaturated carboxylic acid-modified polypropylene is preferably 120° C. or higher and 170° C. or lower from the viewpoint of moldability.

Unsaturated carboxylic acid-modified polypropylene is obtained by a known method in which an unsaturated carboxylic acid is grafted to polypropylene by using a radical as an initiator.

(Composition for Forming Nonporous Layer)

The nonporous layer is preferably formed of a composition containing the styrene-based thermoplastic elastomer (I) described above and the polyolefin (II) described above.

The composition contains the styrene-based thermoplastic elastomer (I) at preferably 60% by mass or more and 90% by mass or less more preferably 65% by mass or more and 85% by mass or less with respect to the total amount of the styrene-based thermoplastic elastomer (I) and the polyolefin (II). A hollow fiber membrane exhibiting superior gas permeation performance is likely to be obtained when the total amount is equal to or lower than the lower limit value of the above range. Superior moldability of the nonporous layer is exhibited when the total amount is equal to or lower than the upper limit value of the above range.

The composition may contain known additives such as an antioxidant, a neutralizing agent, a weathering agent, a lubricant, a nucleating agent, and an antistatic agent in a range in which the effect of the invention is not impaired.

The melting point (DSC melting peak temperature) of the composition of the thermoplastic elastomer constituting the nonporous layer is preferably 130° C. or higher and 165° C. or lower and more preferably 150° C. or higher and 160° C. or lower from the viewpoint of heat resistance, moldability, and the like. The melting point of the composition is derived from the polyolefin (II), and the melting point of the composition can be adjusted to be in the above range by appropriately selecting the polyolefin (II) to be used.

The density of the composition is preferably 0.88 g/cm$^3$ or more and 0.91 g/cm$^3$ or less from the viewpoint of being a resin containing the polyolefin (II).

The composition can be prepared by using a known uniaxial or biaxial melt mixing extruder or a known static melt mixer. The melting temperature at the time of mixing is preferably 160° C. or higher and 220° C. or lower.

Commercially available products can also be used as the composition containing the styrene-based thermoplastic elastomer (I) described above and the polyolefin (II) described above. For example, it is possible to appropriately select and use corresponding one from the "ZELAS (registered trademark)" series manufactured by Mitsubishi Chemical Corporation.

[Porous Supporting Layer]

The resin constituting the porous supporting layer is not particularly limited as long as it is a material which is compatible or adhesive with the composition constituting the nonporous layer, does not cause peeling off between the layers in the stretching step to be described later, and can be made porous. Specifically, polyethylene (for example, high-density polyethylene), polypropylene, polymethylpentene are preferable, and particularly high-density polyethylene is preferable from the viewpoint of having the same melting characteristics as those of the above-described composition for forming the nonporous layer and exhibiting excellent moldability of the porous supporting layer. Furthermore, it is preferable to use high-density polyethylene from the viewpoint of heat resistance.

High-density polyethylene is defined as polyethylene having a density of 0.942 g/cm$^3$ or more in old JIS K 6748: 1995.

Incidentally, in the case of using high-density polyethylene (HDPE) in the porous supporting layer, it is preferable to use a polyolefin other than polyethylene as the polyolefin (II) contained in the above-described composition for forming the nonporous layer. The compatibility of the nonporous layer containing polyethylene with the porous supporting layer containing high-density polyethylene excessively increases, and there is thus a possibility that the stress generated when the porous supporting layer is made porous in the stretching step to be described later is also transmitted to the nonporous layer and cracking of the nonporous layer is likely to occur. In addition, there is also a possibility that thinning of the nonporous layer is hindered.

The melt flow rate (190° C., load: 21.18 N) of the resin constituting the porous supporting layer (hereinafter, also referred to as the "polymer B") is preferably 0.7 g/10 min or more and 5 g/10 min or less from the viewpoint of moldability and the like.

In addition, it is more preferable as the difference in the melt flow rate by JIS K 7210-1999 (code D (temperature: 230° C., load: 21.18 N) is adopted as the measurement conditions) between the polymer B and the above-described composition for forming the nonporous layer (hereinafter, also referred to as the "polymer A") is smaller. The difference in melt flow rate between the polymer A and the polymer B is preferably 2.0 g/10 min or less in consideration of moldability and rigidity.

The melting point of the polymer 13 is preferably 125° C. or higher and 140° C. or lower in the case of polyethylene from the viewpoint of exhibiting excellent opening property when it is highly crystalline. The Vicat softening point of the polymer B is preferably 120° C. or higher and 135° C. or lower from the viewpoint of high crystallinity.

In the present specification, the Vicat softening point is measured in conformity with JIS K 7206-1999.

The polymer B may contain additives such as an antioxidant, an ultraviolet absorber, a lubricant, an antiblocking agent, a coloring agent, and a flame retardant, if necessary, in a range in which the object of the invention is not impaired.

The porosity of the porous supporting layer is preferably 30% by volume or more and 80% by volume or less when the entire hollow fiber membrane is taken as 100% by volume. Excellent gas permeation performance is likely to be obtained when the porosity is 30% by volume or more, and the mechanical strength such as pressure resistance is more favorable when the porosity is 80% by volume or less.

The size of the pores on the porous supporting layer is not particularly limited, and it may be any size as long as sufficient gas permeation performance and mechanical strength can be obtained, and specifically, the pore diameter is preferably 0.01 µm or more and 0.2 µm or less.

[Diameter and Thickness of Hollow Fiber Membrane]

The outer diameter of the hollow fiber membrane is preferably 100 µm or more and 2000 µm or less, more preferably 100 µm or more and 300 µm or less, and still more preferably 125 µm or more and 275 µm or less. When the outer diameter of the hollow fiber membrane is equal to or greater than the lower limit value, the gap between the hollow fiber membranes is likely to be sufficiently taken at the time of producing the hollow fiber membrane module and the potting material is likely to enter the gap. When the outer diameter of the hollow fiber membrane is equal to or smaller than the upper limit value, the size of the whole module can be made small even when a module using a large number of hollow fiber membranes is produced. This makes the volume of the potting portion also small, and it is thus easy to suppress a decrease in dimensional accuracy due to contraction of the potting material at the time of potting processing.

The total membrane thickness of the hollow fiber membrane is preferably 10 µm or more and 200 µm or less, more preferably 20 µm or more and 100 µm or less, and still more preferably 30 µm or more and 75 µm or less. The mechanical strength of the hollow fiber membrane is superior when the total membrane thickness of the hollow fiber membrane is 10 µm or more. When the total membrane thickness of the hollow fiber membrane is 200 µm or less, the outer diameter of the hollow fiber membrane can be made small and the filling factor of the hollow fiber membrane in the hollow fiber membrane module is easily increased.

In the present specification, the outer diameter and inner diameter of the hollow fiber membrane are measured values measured for the cross-sectional sample of hollow fiber membrane to be described below, and the total membrane thickness is a value determined from the respective measured values of the outer diameter and the inner diameter by calculation.

The cross-sectional sample of hollow fiber membrane is obtained by embedding the hollow fiber membrane with a polyurethane resin, breaking it, and arranging it in the center of the slide glass. Thereafter, the short diameter and long diameter of the outer diameter of the cross section of hollow fiber membrane and the short diameter and long diameter of the inner diameter of the cross section of hollow fiber membrane are measured by using a projector "Nikon-V-12A". The long diameter $r^{lo}$ of the outer diameter is the diameter of the longest part in the outer diameter and the short diameter $r^{so}$ of the outer diameter is the diameter orthogonally intersecting the long diameter $r^{lo}$ of the outer diameter at the midpoint thereof. The long diameter $r^{li}$ of the inner diameter is the value of the inner diameter measured on the long diameter $r^{lo}$ of the outer diameter described above and the short diameter $r^{si}$ of the inner diameter is the value of the inner diameter measured on the short diameter $r^{so}$ of the outer diameter described above. The reason for respectively measuring the long diameter and the short diameter for the outer diameter and the inner diameter as described above is because there is a possibility that the cross section is slightly deformed into an ellipse or the like in the production of the hollow fiber membrane although the hollow fiber membrane is desirably a perfect circle.

The short diameter $r^{so}$ and long diameter $r^{lo}$ of the outer diameter are measured for one cross section of hollow fiber membrane and the arithmetic average value thereof is taken as the outer diameter $r^o$ of one cross section of hollow fiber membrane. In the same manner, the short diameter $r^{si}$ and long diameter $r^{li}$ of the inner diameter are measured for one cross section of hollow fiber membrane and the arithmetic average value thereof is taken as the inner diameter $r^i$ of one cross section of hollow fiber membrane.

The measurement described above conducted for five cross sections, and the average value thereof is taken as the inner diameter $r^{iav}$ and the outer diameter $r^{oav}$ of the hollow fiber membrane that is the target for measurement.

The total membrane thickness is calculated by (outer diameter $r^{oav}$–inner diameter $r^{iav}$)/2.

<Method of Producing Hollow Fiber Membrane>

(Spinning Step)

The hollow fiber membrane of the invention can be produced through a spinning step and a drawing step.

In a case in which the hollow fiber membrane to be produced has a three-layer structure in which one nonporous layer is sandwiched between two porous supporting layers, the spinning step is carried out by using a composite nozzle die in which an innermost layer nozzle portion, an intermediate layer nozzle portion, and an outermost layer nozzle portion are concentrically disposed.

Specifically, the resin for forming the porous supporting layer, namely, the polymer B is supplied to the outermost layer nozzle portion and the innermost layer nozzle portion in a molten state, the composition for forming the nonporous layer, namely, the polymer A is supplied to the intermediate layer nozzle portion in a molten state, and subsequently, each of them is extruded from each of the nozzle portions and wound up.

The discharge temperature at the time of extruding the polymers A and B may be a temperature at which these are each sufficiently melted and can be spun.

A hollow fiber membrane precursor is obtained by cooling and solidifying the extruded polymers A and B in an unstretched state while appropriately adjusting the extrusion speed and the winding speed. The hollow fiber membrane precursor has a three-layer structure in which one unstretched nonporous layer precursor is sandwiched between two porous supporting layer precursors in a non-porous state.

(Stretching Step)

The hollow fiber membrane precursor obtained in the spinning step is preferably subjected to a constant length heat treatment (annealing treatment) at a temperature equal to or lower than the melting points of the polymer A and the polymer B before stretching.

It is preferable that the constant length heat treatment is conducted at 105° C. or higher and 130° C. or lower for from 8 to 16 hours in the case of using polyethylene as the polymer B for forming the porous supporting layer. A hollow fiber membrane having favorable quality is likely to be obtained when the temperature for the constant length heat treatment is 105° C. or higher. When the temperature for the constant length heat treatment is 130° C. or lower, a sufficient elongation is likely to be obtained, the stability at the time of stretching is improved, and stretching at a high ratio is easy. In addition, a hollow fiber membrane having favorable quality is likely to be obtained when the treatment time is 8 hours or longer.

In the stretching step, it is preferable that the hollow fiber membrane precursor is stretched at a stretching temperature T equal to or lower than the Vicat softening point of the polymer B. It is possible to measure the expansion of pore diameter of the hollow fiber membrane when the stretching temperature T is equal to or lower than the Vicat softening point of the polymer B, and it is not preferable that the stretching temperature T exceeds the softening point since the crystal lamellar structure is likely to collapse and the porous portion once opened rather tends to be blocked.

In the stretching step, it is preferable to conduct cold stretching before stretching (hot stretching) conducted at the stretching temperature T after the constant length heat treatment described above is conducted, if necessary. Specifically, a two-stage stretching in which hot stretching is subsequently conducted after cold stretching or a multistage stretching in which hot stretching is subsequently conducted in multiple stages of two or more stages after cold stretching is preferable.

Cold stretching is stretching which causes structural destruction of the membrane at a relatively low temperature so as to cause microcracking thereof. The temperature for cold stretching is preferably within a range from 0° C. to a temperature lower than the Vicat softening point by 20 (° C.) or more.

The stretching ratio can be appropriately set according to the polymer A and the polymer B, but the final ratio (total stretching ratio) to the unstretched hollow fiber membrane precursor is preferably set to from 2 to 5 times. When the total stretching ratio is 2 times or more, the porosity of the porous supporting layer is likely to increase and excellent gas permeability is likely to be obtained. The rupture elongation of the hollow fiber membrane is likely to increase when the total stretching ratio is 5 times or less.

It is preferable to subject the hollow fiber membranes after being stretched to heat setting in a state in which the hollow fiber membrane has a constant length or the hollow fiber membrane is slightly relaxed within a range of 70% or less of the constant length in order to improve dimensional stability of the hollow fiber membrane. In order to effectively conduct the heat setting, the temperature for heat setting is preferably equal to or higher than the stretching temperature T and equal to or lower than the lower melting point between the melting points of the polymer A and the polymer B.

<Hollow Fiber Membrane Module>

The hollow fiber membrane module of the invention includes the hollow fiber membrane described above. As a specific form of the hollow fiber membrane module, a form which includes a plurality of hollow fiber membranes and, for example, a tubular housing case to accommodate the hollow fiber membranes and in which the hollow fiber membranes are fixed in the housing case with a potting material in a state in which both end portions of the hollow fiber membranes are opened is preferable from the viewpoint of handling property when deaerating the liquid to be treated, and the like.

The proportion (filling factor) of the hollow fiber membrane in the portion processed with the potting material is preferably about 20% by volume or more and 60% by volume or less.

The material for the housing case is preferably one having chemical resistance as well as a proper mechanical strength, and examples thereof may include a hard polyvinyl chloride resin; a polycarbonate; a polysulfone-based resin; a polyolefin-based resin such as a polypropylene; an acrylic resin; an ABS resin; and a modified polyphenylene oxide.

As the potting material, it is possible to use various kinds of adhesives, sealing materials, polymers, and the like which are usually used in a hollow fiber membrane module, and examples of the adhesive may include an epoxy-based adhesive and a urethane-based adhesive.

Figure 1:
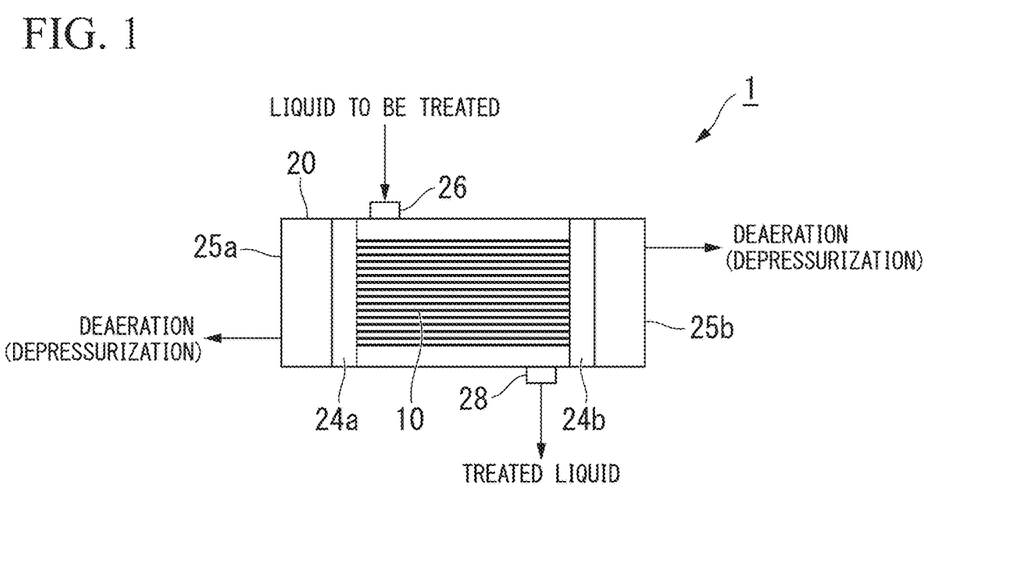
FIG. 1 is an explanatory diagram which illustrates a deaeration method using a hollow fiber membrane module of the invention.

FIG. 1 is a vertical cross-sectional view which schematically illustrates the configuration of an example of the hollow fiber membrane module of the invention.

A hollow fiber membrane module 1 of this example is a hollow fiber membrane module for deaeration to be used for deaeration of a liquid and includes a plurality of hollow fiber membranes 10 and a tubular housing case 20 to accommodate the hollow fiber membranes 10, and the plurality of hollow fiber membranes 10 are fixed in the housing case 20 with potting materials 24a and 24b in a state in which both end portions of the hollow fiber membranes 10 are opened.

A liquid inlet 26 for introducing the liquid to be treated of the target for deaeration and a liquid outlet 28 for taking out the deaerated liquid (treated liquid) are formed on the side surface of the housing case 20.

Caps 25a and 25b having a gas suction port formed thereon are fitted to both end portions of the housing case 20.

Examples of the method of deaerating the liquid to be treated by using the hollow fiber membrane module 1 of this example may include the following method.

The liquid to be treated is supplied to the outer side (primary side) of the hollow fiber membrane 10 in the housing case 20 through the liquid inlet 26, meanwhile, a depressurizing unit such as a vacuum pump is connected to the gas suction port of the caps 25a and 25b and run to depressurize the inner side (secondary side) of the hollow fiber membrane 10. The vacuum degree of the vacuum pump is determined according to the difference in partial pressure of the dissolved gas in the liquid to be treated. By this, the dissolved gas in the liquid to be treated permeates into the membrane, is separated into the inner side of the hollow fiber membrane 10, and is discharged through the gas suction port of the caps 25a and 25b. The treated liquid is recovered through the liquid outlet 28 of the housing case 20.

Incidentally, a plurality of hollow fiber membrane modules may be connected in series for the purpose of deaerating the liquid to be treated to a predetermined deaeration level. In addition, a plurality of hollow fiber membrane modules may be connected in parallel to deaerate a large amount of liquid to be treated.

In addition, in the above description, the liquid to be treated is supplied to the outer side of the hollow fiber membrane and the inner side thereof is depressurized, but the liquid to be treated may be supplied to the inner side of the hollow fiber membrane and the outer side thereof may be depressurized.

The hollow fiber membrane module of the invention can deaerate dissolved gases such as oxygen, nitrogen, carbon monoxide, carbon dioxide, hydrogen sulfide, and ammonia, for example, from a liquid to be treated.

In addition, the hollow fiber membrane module of the invention exhibits excellent heat resistance, and it can be thus suitably used, for example, for deaeration of dissolved oxygen from hot water.

In addition, the hollow fiber membrane module of the invention can also be used in applications other than deaeration. Examples of specific applications may include decarbonation or oxygen enriching treatment (CWT) of boiler reflux water and decarbonation and carbonate enriching treatment of high-temperature water such as carbonated springs and the like.

In addition, the permeability of the hollow fiber membrane module of the invention by water vapor is low, and a load to the depressurizing unit, such as a vacuum pump, which depressurizes the secondary side of the deaeration membrane is decreased when deaerating a liquid to be treated which contains water.

EXAMPLES

Hereinafter, the invention will be described more specifically with reference to Examples, but the invention is not limited by the following Examples.

Various measurement methods will be described below.

[Rupture Elongation]

The rupture elongation was measured by using a dumbbell for tensile test fabricated by forming the polymer used in the nonporous layer into a sheet and a tensile tester (Tensilon 200 manufactured by TOYO SEIKI SEISAKU-SHO, LTD.). The shape of the dumbbell for tensile test is based on the shape No. 3 in ISO 37 (JIS K 6251) of the international standard. Specifically, the rupture elongation is the elongation (unit %) at the time of rupture measured under a condition having a tensile rate of 5 cm/min in an environment having a temperature of 23° C. and a humidity of 50%, and it is a value determined based on the prescription of ISO 37 (2010).

[Melting Point and Vicat Softening Point]

A differential scanning calorimeter (DSC) was used for the measurement of the melting point. Specifically, the melting point was determined from the melting peak temperature and the melting end temperature when about 5 mg of the sample was melted at 200° C. for 5 minutes, crystallized by lowering the temperature to 40° C. at a rate of 10° C./min, and then melted again by raising the temperature to 200° C. at 10° C./min.

The Vicat softening point was measured in conformity with JIS K 7206-1999.

[Melt Flow Rate (MFR)]

The melt flow rate (MFR (g/10 min) was determined by measuring the mass of the resin extruded in a strand shape at 230° C. and a load of 2.16 kg (21.18 N) for 10 minutes by using a melt indexer in conformity with JIS K 7210-1999.

[Density]

The density of a sample prepared by subjecting the strand obtained at the time of MFR measurement at 230° C. and a load of 2.16 kg (21.18 N) to a heat treatment at 100° C. for 1 hour and gradually cooling the strand to room temperature over 1 hour was measured by using a density gradient tube in conformity with JIS K 7112-1999.

[Amount of Each Unit in Poly-Conjugated Diene Portion (B)]

It was determined as follows by $^1$H-NMR measurement.

In an NMR sample tube having an outer diameter of 5 mm, 25 mg of a sample for the ABA type styrene-based thermoplastic elastomer ($\alpha$) was put and dissolved by adding 0.7 ml of $CDCl_3$ (containing 0.03 v/v % TMS (tetramethylsilane)). $^1$H-NMR was measured at a cumulative number of 64 times and room temperature by using the AVANCE 400 spectrometer manufactured by Bruker. The conditions for $^1$H-NMR measurement are as follows.

Resonance frequency: 400.1 MHz
Flip angle: 45 degrees
Data acquisition time: 4 s
Pulse repetition time: 10 s
Basis for chemical shift: TMS signal was set as 0.00 ppm.

The amount (ratio) of each unit was calculated from the integrated values of the peaks which were derived from a 1,2-bonding unit and a 3,4-bonding unit and present at 4.2 ppm or more and 5.0 ppm or less and the integrated value of the peak which was derived from a 1,4-bonding unit and present at 5.0 ppm or more and 5.45 ppm or less in the $^1$H-NMR chart.

[Oxygen Permeation Rate and Nitrogen Permeation Rate]

The hollow fiber membranes obtained in each example were bundled in a U shape, and the end portions of the hollow fiber membranes were fixed with a urethane resin, thereby fabricating a hollow fiber membrane module. Oxygen or nitrogen was supplied from the outer side of the hollow fiber membrane, the pressure in the inner side (hollow portion side) of the hollow fiber membrane was set to normal pressure, and the oxygen permeation rate ($QO_2$) (unit: m/hour·MPa) and the nitrogen permeation rate ($QN_2$) (unit: m/hour·MPa) at 20° C. were measured.

Incidentally, the membrane area was calculated based on the inner diameter of the hollow fiber membrane. Thereafter, the separation coefficient ($QO_2/QN_2$) was determined from the oxygen permeation rate ($QO_2$) and nitrogen permeation rate ($QN_2$) measured.

[Porosity and Pore Size of Membrane Surface]

The mass and volume of the hollow fiber membrane were measured, and the porosity was calculated by the following Equation (1).

Porosity (% by volume)={1−(mass (g) of hollow fiber membrane)/[(true specific gravity of hollow fiber membrane (g/cm³))×(volume of hollow fiber membrane (cm³))]}×100   (1)

Regarding the pore diameter of the membrane surface (the diameter of the pores on the porous support), the membrane is observed and measured through a microscope such as a scanning electron microscope, a transmission electron microscope, or an atomic microscope to determine the pore diameter of the membrane surface. In the present Example, a scanning electron microscope was used. The number of samples for measurement is 6, and the average value thereof is adopted.

[Outer Diameter, Inner Diameter, and Total Membrane Thickness of Hollow Fiber Membrane]

The outer diameter and inner diameter of the hollow fiber membrane were measured for the cross-sectional sample of hollow fiber membrane to be described below, and the total membrane thickness was determined by calculation from the measured values of the outer diameter and the inner diameter as to be described later.

The cross-sectional sample of hollow fiber membrane was obtained by embedding the hollow fiber membrane with a polyurethane resin, breaking it, and arranging it in the center of the slide glass. Thereafter, the short diameter and long diameter of the outer diameter of the cross section of hollow fiber membrane and the short diameter and long diameter of the inner diameter of the cross section of hollow fiber membrane were measured by using a projector "Nikon-V-12A". The long diameter $r^{lo}$ of the outer diameter is the diameter of the longest part in the outer diameter and the short diameter $r^{so}$ of the outer diameter is the diameter orthogonally intersecting the long diameter $r^{lo}$ of the outer diameter at the midpoint thereof. The long diameter r of the inner diameter is the value of the inner diameter measured on the long diameter $r^{lo}$ of the outer diameter described above and the short diameter $r^{si}$ of the inner diameter is the value of the inner diameter measured on the short diameter $r^{so}$ of the outer diameter described above.

The short diameter $r^{so}$ and long diameter $r^{lo}$ of the outer diameter were measured for one cross section of hollow fiber membrane and the arithmetic average value thereof was taken as the outer diameter $r^o$ of one cross section of hollow fiber membrane. In the same manner, the short diameter $r^{si}$ and long diameter $r^{li}$ of the inner diameter were measured for one cross section of hollow fiber membrane and the arithmetic average value thereof was taken as the inner diameter $r^i$ of one cross section of hollow fiber membrane.

The measurement described above conducted for five cross sections, and the average value thereof was taken as the inner diameter $r^{iav}$ and the outer diameter $r^{oav}$ of the hollow fiber membrane that was the target for measurement. The total membrane thickness was calculated by (outer diameter $r^{oav}$−inner diameter $r^{iav}$)/2.

In each of subsequent Examples, the inner diameter $r^{iav}$ and the total membrane thickness are described, and the description of the outer diameter $r^{oav}$ is omitted.

[Film Thickness of Nonporous Layer]

The hollow fiber membrane was frozen and fractured in liquid nitrogen to be sectioned, and the cross section was observed through a scanning electron microscope (SEM). The thickness of the nonporous layer was determined by measuring the thickness of the nonporous layer sandwiched between the porous supporting layers in the cross-sectional direction of the membrane. The number of samples for measurement was 6, and the average value thereof was adopted.

Example 1

The spinning step was carried out by using a composite nozzle die in which an innermost layer nozzle portion, an intermediate layer nozzle portion, and an outermost layer nozzle portion were concentrically disposed.

High-density polyethylene (trade name "SANTEC (registered trademark) B161" manufactured by ASAHI KASEI CORPORATION, melting point: 130° C., MFR 1.57 g/10 min (value measured at 230° C., catalog value: MFR 1.3 g/10 min measured at 190° C.), density 0.963 g/cm³, Vicat softening point 120° C.) produced through homopolymerization by using a Ziegler-Natta-based catalyst was supplied to the innermost layer nozzle portion and the outermost layer nozzle portion as a resin for forming the porous supporting layer.

Meanwhile, a thermoplastic elastomer (MFR 2.2 g/10 min (230° C., load: 21.18 N (JIS K 7210)), density: 0.89 g/cm³, DSC melting peak temperature: 156° C., rupture elongation: 990%) obtained by blending polypropylene (MFR: 2.5 g/10 min (230° C., load: 21.18 N (JIS K 7210)), density: 0.89 g/cm³, melting point: 156° C.) and a hydrogenated product of an ABA type styrene-butadiene/isoprene-styrene block copolymer (styrene content (content of polystyrene portion (A)): 12% by mass, mass average molecular weight (Mw): 90,000, total amount of 1,2-bonding unit and 3,4-bonding unit: 65% by mole, hydrogenation rate: 100% by mole) by using a twin screw extruder ("PCM 30" manufactured by Ikegai Corporation, set temperature 200° C.) was supplied to the intermediate layer nozzle portion as a composition for forming the nonporous layer.

Thereafter, melt spinning was conducted at a discharge port temperature of 190° C. and a winding speed of 140 m/min.

Incidentally, the content of polypropylene in the composition was set to 30% by mass and the content of the hydrogenated product of styrene-butadiene/isoprene-styrene block copolymer in the composition was set to 70% by mass.

The hollow fiber membrane thus obtained was subjected to an annealing treatment in a state of being wound around a bobbin under a condition of 108° C. and 8 hours, subsequently stretched at normal temperature (20° C.) to have a total stretching ratio of 150%, and subsequently hot-stretched in a heating furnace heated to 110° C. until the total stretching ratio reached 580%. Furthermore, the hollow fiber membrane was subjected to relaxation heat setting in a heating furnace heated to 130° C. so as to have a total stretching ratio of 300%.

As a result of evaluation on the membrane performance of the hollow fiber membrane thus obtained, the hollow fiber membrane had a porosity of 60% by volume, an inner diameter $r^{iav}$ of 190 μm, a total membrane thickness of 40 μm, and a film thickness of the nonporous layer of 1 μm.

Figure 2:
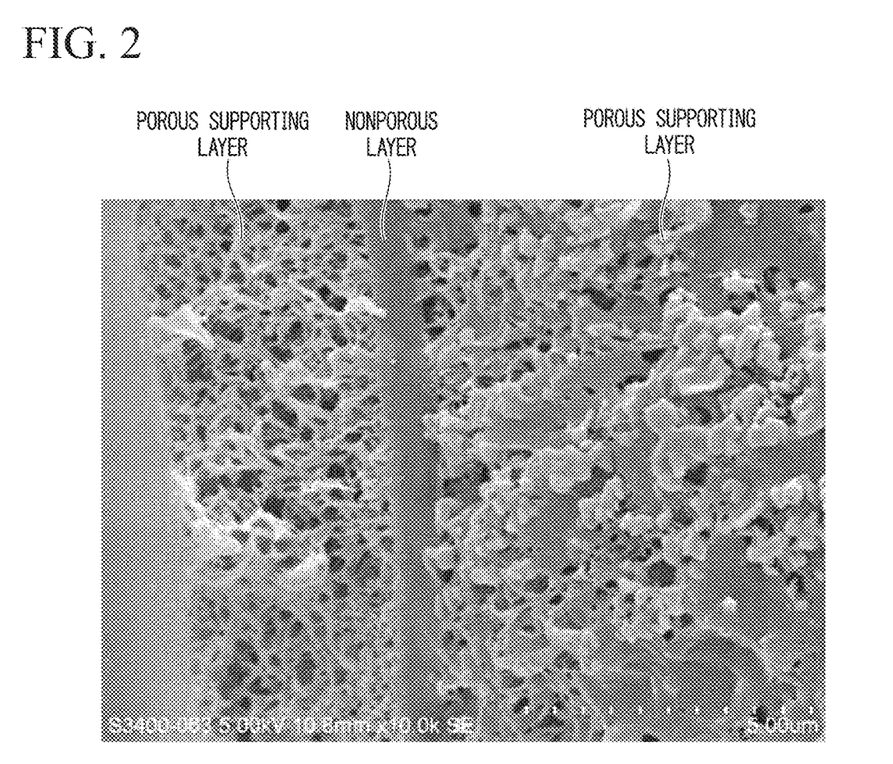
FIG. 2 is an image of a cross section (radial direction) of a hollow fiber membrane produced in Example 1 taken by an electron microscope.
Figure 3:
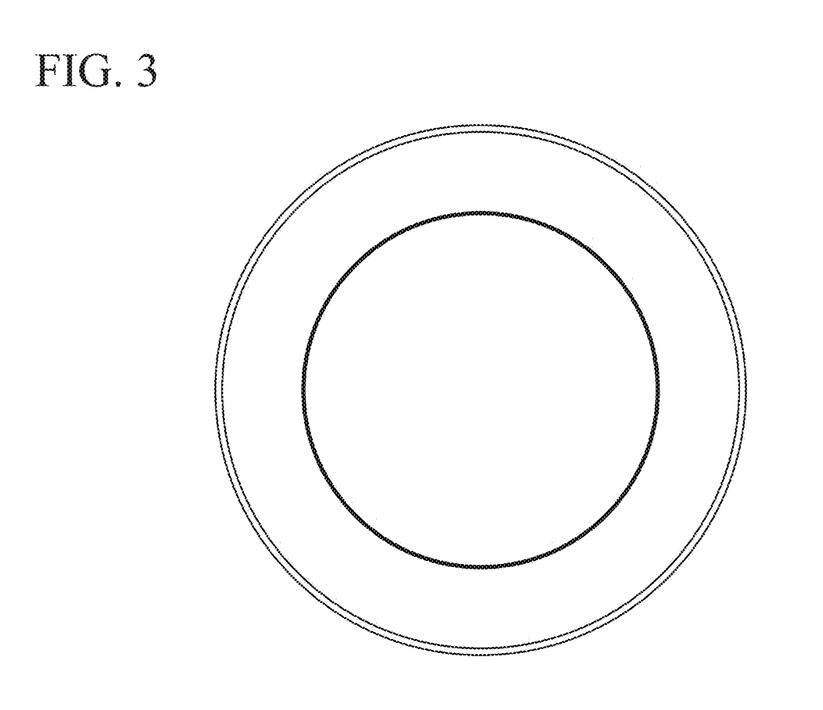
FIG. 3 is a cross-sectional view (circumferential direction) of a hollow fiber membrane having a two-layer structure of the invention.

In addition, as illustrated in FIG. 2, the cross section (radial direction) of the hollow fiber membrane was observed through a scanning electron microscope (SEM), as a result, pores having a pore size of about 0.05 μm were densely present all over the porous supporting layer positioned in the innermost layer and the outermost layer but pores were not observed on the nonporous layer (intermediate layer).

The gas permeation rate through the hollow fiber membrane was measured, as a result, the oxygen permeation rate ($QO_2$) was 0.29 m/hour·MPa and the nitrogen permeation rate ($QN_2$) was 0.10 m/hour·MPa at room temperature (20° C.) and the separation coefficient ($QO_2/QN_2$) was 2.9.

A hollow fiber membrane module (membrane area: 10 m$^2$) in the form illustrated in FIG. 1 was fabricated by using the hollow fiber membrane, and deaeration of a liquid to be treated (carbon dioxide gas concentration: 7.5 ppm, 60° C.) was conducted by allowing the liquid to be treated to pass through the hollow fiber membrane module and evacuating the secondary side. As a result, the carbon dioxide gas concentration in the liquid after being subjected to the deaerating treatment thus obtained decreased to 10 ppb>.

Example 2

A hollow fiber membrane and a hollow fiber membrane module were produced in the same manner as in Example 1 except that a thermoplastic elastomer (MFR 2.2 g/10 min (230° C., load: 21.18 N (JIS K 7210)), density: 0.89 g/cm$^3$, DSC melting peak temperature: 156° C., rupture elongation: 880%) obtained by blending anhydrous maleic acid-modified polypropylene (MFR: 3.5 g/10 min (230° C., load: 21.18 N (JIS K 7210)), density: 0.89 g/cm$^3$, melting point: 156° C., acid modification rate: 0.08% by mass), a hydrogenated product of an ABA type styrene-butadiene/isoprene-styrene block copolymer (styrene content (content of polystyrene portion (A)): 12% by mass, mass average molecular weight (Mw): 90,000, total amount of 1,2-bonding unit and 3,4-bonding unit: 65% by mole, hydrogenation rate: 100% by mole), and a hydrogenated product of an ABA type styrene-butadiene-styrene block copolymer (styrene content (content of polystyrene portion (A)): 13% by mass, mass average molecular weight (Mw): 100,000, 1,2-bonding unit: 60% by mole, hydrogenation rate: 100% by mole) by using a twin screw extruder ("PCM 30" manufactured by Ikegai Corporation, set temperature 200° C.) as a composition for forming the nonporous layer was supplied to the intermediate layer nozzle portion as a composition for forming the nonporous layer, and subjected to the same evaluation.

Incidentally, the content of anhydrous maleic acid-modified polypropylene in the composition for forming the nonporous layer was set to 30% by mass, the content of the hydrogenated product of styrene-butadiene/isoprene-styrene block copolymer in the composition was set to 20% by mass, and the content of the hydrogenated product of styrene-butadiene-styrene block copolymer in the composition was set to 50% by mass.

In addition, the discharge port temperature was set to 220° C. and the winding speed was set to 180 m/min.

As a result of evaluation on the membrane performance of the hollow fiber membrane thus obtained, the hollow fiber membrane had a porosity of 61% by volume, an inner diameter $r^{iav}$ of 190 μm, a total membrane thickness of 40 μm, and a film thickness of the nonporous layer of 1 μm.

In addition, the cross section (radial direction) of the hollow fiber membrane was observed through a scanning electron microscope (SEM), as a result, pores having a pore size of about 0.05 μm were densely present all over the porous supporting layer positioned in the innermost layer and the outermost layer but pores were not observed on the nonporous layer (intermediate layer).

The gas permeation rate through the hollow fiber membrane was measured, as a result, the oxygen permeation rate ($QO_2$) was 0.32 m/hour·MPa and the nitrogen permeation rate ($QN_2$) was 0.094 m/hour·MPa at room temperature (20° C.) and the separation coefficient ($QO_2/QN_2$) was 3.4.

Deaeration of a liquid to be treated (carbon dioxide gas concentration: 7.5 ppm, 60° C.) was conducted by allowing the liquid to be treated to pass through the hollow fiber membrane module and evacuating the secondary side. As a result, the carbon dioxide gas concentration in the liquid after being deaerated thus obtained decreased to 10 ppb>.

Example 3

A nozzle for hollow fiber production which were capable of forming a three-layer structure and concentrically disposed and had a discharge port was used and polypropylene produced through homopolymerization by using a Ziegler-Natta-based catalyst (trade name: Novatec FY6H manufactured by JAPAN POLYPROPYLENE CORPORATION, melting point 160° C., MFR 2.3 g/10 min (230° C.), density 0.90 g/cm$^3$) was used in the portions of the inner layer and the outer layer. The nonporous layer (intermediate layer) was formed in the same manner as in Example 1.

Melt spinning was conducted at a discharge port temperature of 220° C. and a winding speed of 180 m/min by using these.

The hollow fiber thus obtained was subjected to an annealing treatment in a state of being wound around a bobbin at 125° C. ford 8 hours, subsequently stretched at normal temperature (20° C.) to have a total stretching ratio of 150%, subsequently hot-stretched in a heating furnace heated to 110° C. until the total stretching ratio reached 580%, and further subjected to relaxation heat setting in a heating furnace heated to 130° C. so as to have a total stretching ratio of 300%.

As a result of evaluation on the membrane performance of the composite hollow fiber membrane thus obtained, the hollow fiber membrane had an overall porosity of 40% by volume, an inner diameter of 130 μm, a total membrane thickness of 25 μm, and a film thickness of the intermediate layer of 1 μm. As a result of observation through a scanning electron microscope (SEM), pores having a pore size of about 0.05 μm were densely present on the entire surface of the inner and outer surfaces (porous supporting layer) but pores were not observed on the intermediate layer portion.

The gas permeation rate through the composite hollow fiber membrane was measured, and the result was as favorable as in Example that the oxygen permeation rate ($QO_2$) was 0.08 m/hour·MPa and the nitrogen permeation rate ($QN_2$) was 0.023 m/hour·MPa at room temperature (20° C.) and the separation coefficient ($QO_2/QN_2$) was 3.4.

Deaeration of raw water (carbon dioxide gas concentration: 7.5 ppm, 60° C.) was conducted by allowing the raw water to pass through a 10 m$^2$ hollow fiber membrane module fabricated by using the composite hollow fiber membrane thus fabricated and evacuating the secondary side, however, the result was that the carbon dioxide gas concentration on the exit side of the module decreased only to 1 ppm and the hollow fiber membrane module was thus slightly inferior to Example 1 and Example 2 in heat resistance.

Comparative Example 1

The spinning step was carried out by using the same composite nozzle die as that in Example 1.

High-density polyethylene (trade name: Hizex 2200J manufactured by Mitsui Chemicals, Inc., density: 0.968 g/cm$^3$, melting point: 130° C.) was supplied to the innermost layer nozzle portion and the outermost layer nozzle portion as a resin for forming the porous supporting layer.

Meanwhile, a thermoplastic elastomer (DSC melting peak temperature: 80° C., rupture elongation: 700%) obtained by melt blending low-density polyethylene "ENGAGE (registered trademark) 8200" (density: 0.870 g/cm$^3$, melting point: 50° C.) manufactured by the Dow Chemical Company and a hydrogenated product of an ABA type styrene-butadiene-styrene block copolymer (trade name "KRATON (registered trademark) G-1657" manufactured by Shell Chemicals, amount of 1,2-bonding unit: 35% by mole, styrene content (content of polystyrene portion (A)): 13% by mass, mass average molecular weight (Mw): 110,000, hydrogenation rate: 100%) by using a twin screw extruder was supplied to the intermediate layer nozzle portion as a composition for forming the nonporous layer.

Thereafter, melt spinning was conducted at a discharge port temperature of 200° C. and a winding speed of 180 m/min.

Incidentally, the content of low-density polyethylene in the composition was set to 20% by mass and the content of the hydrogenated product of styrene-butadiene-styrene block copolymer in the composition was set to 80% by mass.

The hollow fiber membrane thus obtained was subjected to an annealing treatment under a condition of 118° C. and 10 minutes, subsequently stretched at 23±2° C. to have a total stretching ratio of 130%, and subsequently hot-stretched in a heating furnace heated to 120° C. until the total stretching ratio reached 260%. Furthermore, the hollow fiber membrane was subjected to relaxation heat setting in a heating furnace heated to 130° C. so as to have a total stretching ratio of 200%.

As a result of evaluation on the membrane performance of the hollow fiber membrane thus obtained, the hollow fiber membrane had a porosity of 42% by volume, an inner diameter $r^{iav}$ of 200 μm, a total membrane thickness of 40 μm, and a film thickness of the nonporous layer of 1 μm.

In addition, the cross section (radial direction) of the hollow fiber membrane was observed through a scanning electron microscope (SEM), as a result, pores having a pore size of about 0.1 μm were densely present all over the porous supporting layer positioned in the innermost layer and the outermost layer but pores were not observed on the nonporous layer (intermediate layer).

The gas permeation rate through the hollow fiber membrane was measured, as a result, the oxygen permeation rate ($QO_2$) was 0.10 m/hour·MPa and the nitrogen permeation rate ($QN_2$) was 0.03 m/hour·MPa at room temperature (20° C.) and the separation coefficient ($QO_2/QN_2$) was 3.0.

A hollow fiber membrane module was fabricated by using the hollow fiber membrane in the same manner as in Example 1 and subjected to deaeration in the same manner, as a result, hot water leaked on the secondary side and it was thus not possible to stably conduct deaeration.

Comparative Example 2

The operation was conducted in the same manner as in Comparative Example 1 except that a thermoplastic elastomer (melting point: 80° C., rupture elongation: 850%) obtained through melt blending using a hydrogenated product of an ABA type styrene-isoprene-styrene block copolymer (trade name "SEPTON (registered trademark) 2023" manufactured by KURARAY CO., LTD., amount of 3,4-bonding unit: 30% by mole, styrene content (content of polystyrene portion (A)): 13% by mass, mass average molecular weight (Mw): 100,000, hydrogenation rate: 100%) instead of the hydrogenated product of an ABA type styrene-butadiene-styrene block copolymer (trade name "KRATON (registered trademark) G-1657" manufactured by Shell Chemicals) used in Comparative Example 1 by a twin screw extruder was supplied to the intermediate layer nozzle portion as a composition for forming the nonporous layer.

As a result of evaluation on the membrane performance of the hollow fiber membrane thus obtained, the hollow fiber membrane had a porosity of 40% by volume, an inner diameter $r^{iav}$ of 203 μm, a total membrane thickness of 42 μm, and a film thickness of the nonporous layer of 1 μm.

In addition, the cross section (radial direction) of the hollow fiber membrane was observed through a scanning electron microscope (SEM), as a result, pores having a pore size of about 0.1 μm were densely present all over the porous supporting layer positioned in the innermost layer and the outermost layer but pores were not observed on the nonporous layer (intermediate layer).

The gas permeation rate through the hollow fiber membrane was measured, as a result, the oxygen permeation rate ($QO_2$) was 0.06 m/hour·MPa and the nitrogen permeation rate ($QN_2$) was 0.02 m/hour·MPa at room temperature (20° C.) and the separation coefficient ($QO_2/QN_2$) was 3.0.

A hollow fiber membrane module was fabricated by using the hollow fiber membrane in the same manner as in Example 1 and subjected to deaeration in the same manner, as a result, hot water leaked on the secondary side and it was thus not possible to stably conduct deaeration.

INDUSTRIAL APPLICABILITY

According to the invention, it is possible to provide a hollow fiber membrane which exhibits favorable gas permeation performance and excellent heat resistance and in which the generation of pinholes are suppressed and a hollow fiber membrane module using the same.

EXPLANATIONS OF LETTERS OR NUMERALS

1: Hollow fiber membrane module
10: Hollow fiber membrane
20: Housing case
24*a* and 24*b*: Potting material
25*a* and 25*b*: Cap
26: Liquid inlet
28: Liquid outlet

The invention claimed is:
1. A hollow fiber membrane comprising:
a gas permeable nonporous layer; and
a porous supporting layer to support the nonporous layer, wherein:
the nonporous layer is formed of a thermoplastic elastomer having a DSC melting peak temperature of 130° C. or higher and a rupture elongation prescribed in ISO 37 (2010) of 300% or more,
the nonporous layer is formed of a composition containing a styrene-based thermoplastic elastomer (I) and a polyolefin (II), wherein the styrene-based thermoplastic elastomer (I) containing at least either of an ABA type styrene-based thermoplastic elastomer (α) having a polystyrene portion (A) and a poly-conjugated diene portion (B) or a hydrogenated product (αh) of the ABA type styrene-based thermoplastic elastomer (α), and
the composition contains the styrene-based thermoplastic elastomer (I) at 60% by mass or more and 90% by mass or less with respect to a total amount of the styrene-based thermoplastic elastomer (I) and the polyolefin (II), and the polyolefin (II) is an unsaturated carboxylic acid-modified polypropylene.

2. The hollow fiber membrane according to claim 1, wherein the poly-conjugated diene portion (B) contains at least either of a 1,2-bonding unit or a 3,4-bonding unit, wherein a total amount of the 1,2-bonding unit and the 3,4-bonding unit is 50% by mole or more with respect to a total amount of the entire units constituting the poly-conjugated diene portion (B).

3. The hollow fiber membrane according to claim 1, wherein the poly-conjugated diene portion (B) contains at least either of butadiene or isoprene as a component.

4. The hollow fiber membrane according to claim 1, wherein a thickness of the nonporous layer is 0.5 μm or more and 10 μm or less.

5. The hollow fiber membrane according to claim 1, wherein the porous supporting layer is formed of polyethylene.

6. The hollow fiber membrane according to claim 5, wherein polyethylene is high-density polyethylene.

7. A hollow fiber membrane module comprising the hollow fiber membrane according to claim 1.

8. The hollow fiber membrane according to claim 2, wherein the total amount of the 1,2-bonding unit and the 3,4-bonding unit is 60% by mole or more and 80% by mole or less with respect to a total amount of the entire units constituting the poly-conjugated diene portion (B).

9. The hollow fiber membrane according to claim 2, wherein the total amount of the 1,2-bonding unit and the 3,4-bonding unit is 60% by mole or more and 70% by mole or less with respect to a total amount of the entire units constituting the poly-conjugated diene portion (B).

10. The hollow fiber membrane according to claim 1, wherein the unsaturated carboxylic acid-modified polypropylene is a graft product of an unsaturated carboxylic acid selected from the group consisting of anhydrous maleic acid, acrylic acid, methacrylic acid, maleic acid, itaconic acid and fumaric acid.

11. The hollow fiber membrane according to claim 1, wherein a mass average molecular weight (Mw) of each of the ABA type styrene-based thermoplastic elastomer ($\alpha$) and the hydrogenated product ($\alpha$H) is 5,000 or more and 150,000 or less.

12. The hollow fiber membrane according to claim 1, wherein a mass average molecular weight (Mw) of each of the ABA type styrene-based thermoplastic elastomer ($\alpha$) and the hydrogenated product ($\alpha$H) is 7,000 or more and 130,000 or less.

* * * * *